US009250503B2

United States Patent
Tani et al.

(10) Patent No.: US 9,250,503 B2
(45) Date of Patent: Feb. 2, 2016

(54) IMAGE DISPLAY DEVICE AND LIGHT SOURCE COOLING METHOD

(75) Inventors: Tadashi Tani, Tokyo (JP); Yukinori Shioya, Tokyo (JP); Jiro Takami, Tokyo (JP)

(73) Assignee: NEC DISPLAY SOLUTIONS, LTD., Tokyo (JP)

( * ) Notice: Subject to any disclaimer, the term of this patent is extended or adjusted under 35 U.S.C. 154(b) by 389 days.

(21) Appl. No.: 13/813,401

(22) PCT Filed: Aug. 5, 2010

(86) PCT No.: PCT/JP2010/063307
§ 371 (c)(1),
(2), (4) Date: Jan. 30, 2013

(87) PCT Pub. No.: WO2012/017541
PCT Pub. Date: Feb. 9, 2012

(65) Prior Publication Data
US 2013/0128456 A1  May 23, 2013

(51) Int. Cl.
*G03B 21/20* (2006.01)
*G03B 21/16* (2006.01)
*G03B 21/14* (2006.01)

(52) U.S. Cl.
CPC ............... *G03B 21/16* (2013.01); *G03B 21/14* (2013.01); *G03B 21/20* (2013.01)

(58) Field of Classification Search
CPC ......... G03B 21/14; G03B 21/16; G03B 21/20
USPC ........ 353/52, 57, 58, 85, 98, 121; 349/5, 7, 9; 362/294
See application file for complete search history.

(56) References Cited

U.S. PATENT DOCUMENTS

| 7,131,731 | B2 * | 11/2006 | Oketani | 353/57 |
| 8,050,449 | B2 * | 11/2011 | Kim | 382/100 |
| 2005/0219430 | A1 * | 10/2005 | Nagano | 349/9 |
| 2007/0285623 | A1 * | 12/2007 | Kuraie | 353/58 |
| 2008/0030689 | A1 * | 2/2008 | Hsu | 353/57 |
| 2010/0026965 | A1 | 2/2010 | Namba et al. | |
| 2011/0128508 | A1 * | 6/2011 | Yamada | H05B 41/2883 353/85 |
| 2011/0188008 | A1 * | 8/2011 | Maeda | G03B 21/14 353/85 |

FOREIGN PATENT DOCUMENTS

| JP | 63-200136 A | 8/1988 |
| JP | 11-288790 A | 10/1999 |
| JP | 2003-005147 A | 1/2003 |

(Continued)

OTHER PUBLICATIONS

International Search Report in PCT/JP2010/063307 dated Sep. 7, 2010 (with English translation thereof).

*Primary Examiner* — Sultan Chowdhury
(74) *Attorney, Agent, or Firm* — McGinn IP Law Group PLLC

(57) ABSTRACT

An image display device has a light source; a power supply section that supplies power to a light source; a cooling fan that cools the light source; a input section; and a control section that controls the cooling fan and the power supply section. If a first lighting mode in which a power value supplied to the light source is a first setting value is designated through the input section, the control section causes the power supply section to supply power that corresponds to the first setting value to the light source and causes the cooling fan to operate.

11 Claims, 5 Drawing Sheets

(56) References Cited

FOREIGN PATENT DOCUMENTS

| JP | 2003-295320 A | 10/2003 |
| JP | 2005-326646 A | 11/2005 |
| JP | 2006-235317 A | 9/2006 |
| JP | 2009-069459 A | 4/2009 |
| JP | 2010-032944 A | 2/2010 |

* cited by examiner

IMAGE DISPLAY DEVICE AND LIGHT SOURCE COOLING METHOD

TECHNICAL FIELD

The present invention relates to an image display device having a high pressure mercury lamp or the like as a light source.

BACKGROUND ART

An image display device such as a liquid crystal display or a projector is provided with a high pressure mercury lamp or the like as a light source. A high pressure mercury lamp is structured such that mercury or gas is confined in a glass tube. Thus, if the temperature of the lamp excessively rises, the glass tube will explode. To prevent such a situation, image display devices that use a high pressure mercury lamp as a light source are generally provided with a cooling fan that cools the light source.

Patent Literature 1 describes a projector that has a light source; a temperature measurement means that measures the temperature in the neighborhood of the light source; a cooling fan that cools the light source; and a control section that controls voltage supplied to the cooling fan based on the temperature measured by the temperature measurement means.

The foregoing projector controls voltage supplied to the cooling fan such that the number of rotations of the cooling fan that has been set according to the measured value of the temperature is maintained.

Recent projectors that have a high pressure mercury lamp or the like as a light source are provided with an energy saving mode that the user can select so as to decrease the brightness of an image. Energy saving modes include a low power lighting mode that allows power supplied to the lamp to be decreased to around several tens of percent of the maximum power.

The foregoing low power lighting mode may be manually set up if the user does not need a high brightness image. Alternatively, when an image that the user does not watch is generated, for example, a lens shutter or the like causes a projected image to become a black image, a blue screen is displayed after an external image signal has not been input for a predetermined time, or an AV mute function is activated so as to temporarily stop displaying an image and outputting sound, the low power lighting mode may be set up along with such an image.

When the temperature of the light source in the high brightness image display state is compared with that in the low brightness image display state, it is natural that the temperature of the light source in the low brightness image display state is lower than the temperature in the high brightness image display state. In addition, since these temperatures are constant to some extent, it can be contemplated that the number of rotations of the cooling fan may be controlled based on the selected lighting mode without it being necessary to provide a temperature measurement means as described in Patent Literature 1.

RELATED ART LITERATURE

Patent Literature

Patent Literature 1: JP2009-69459A, Publication

SUMMARY OF THE INVENTION

When the temperature of a high pressure mercury lamp becomes excessively low, a photo-darkening phenomenon due to adhesion of mercury to the inner plane of a glass tube will occur. Thus, when the light source cooling fan of an image display device having a high pressure mercury lamp or the like as a light source is operated during the foregoing low power lighting mode, the light source will be excessively cooled and thereby the temperature of the light source will become lower than is necessary and a photo-darkening phenomenon will occur.

An object of the present invention is to provide an image display device and a light source cooling method that have a simple structure so as to prevent the occurrence of the photo-darkening phenomenon during the low power lighting mode.

An image display device according to the present invention is an image display device that has a light source and that displays an image in which light emitted from the light source has been spatially modulated, comprising:

a power supply section that supplies power to said light source;

a first cooling fan that cools said light source;

an input section that accepts an input signal that designates either a first lighting mode in which a power value supplied to said light source is a first setting value or a second lighting mode in which the power value supplied to said light source is a second setting value that is smaller than said first setting value and outputs a designation signal that represents the designated mode; and a control section that controls an operation of said first cooling fan and controls said power supply section to supply power to said light source.

If said control section accepts said designation signal that denotes that said first lighting mode has been designated from said input section, said control section causes said power supply section to supply power corresponding to said first setting value to said light source and said first cooling fan to operate, and if said control section accepts said designation signal that denotes that said second lighting mode has been designated from said input section, said control section causes said power supply section to supply power corresponding to said second setting value to said light source and causes said first cooling fan to stop.

A light source cooling method according to the present invention is a light source cooling method for an image display device having a light source, a power supply section that supplies power to the light source, and a cooling fan that cools said light source and that displays an image in which light emitted from said light source has been spatially modulated, comprising:

causing said power supply section to supply power corresponding to said first setting value to said light source and causing said cooling fan to operate if a first lighting mode, in which a power value supplied to said light source is a first setting value, is designated; and causing said power supply section to supply power corresponding to said second setting value to said light source and causing said cooling fan to stop if a second lighting mode, in which the power value supplied to said light source is a second value that is smaller than said first setting value, is designated.

DESCRIPTION OF REFERENCE NUMERALS

1 Control section
2 Power supply section
3 Light source
4 Cooling fan
5 Input section

BEST MODES THAT CARRY OUT THE INVENTION

Next, with reference to the accompanying drawings, embodiments of the present invention will be described.

First Embodiment

Figure 1:
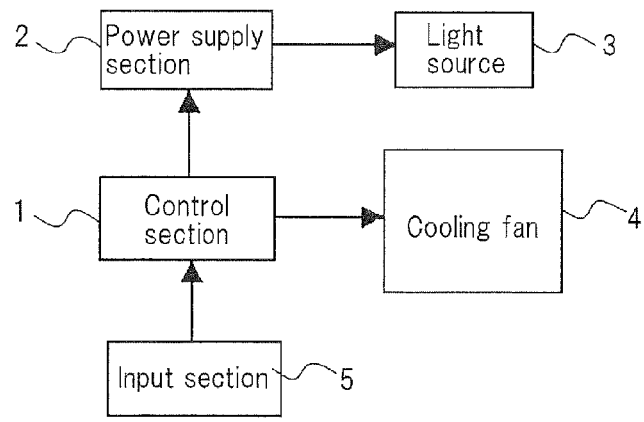
FIG. 1 is a block diagram showing the structure of an image display device according to a first embodiment of the present invention.

FIG. 1 is a block diagram showing the structure of an image display device according to a first embodiment of the present invention.

The image display device shown in FIG. 1 is an image display device that has a high pressure mercury lamp or the like as light source 3 and that displays an image in which light emitted from light source 3 has been spatially modulated. The image display device has control section 1, power supply section 2, light source 3, cooling fan 4, and input section 5.

Power supply section 2 supplies power to light source 3. Cooling fan 4 cools the light source.

Input section 5 has a plurality of buttons. The user can designate either a first lighting mode in which a power value supplied to light source 3 is a first setting value or a second lighting mode in which a power value supplied to light source 3 is a second setting value that is smaller than the first setting value. Input section 5 outputs a designation signal that represents the designated mode.

The first setting value is, for example, the maximum power that can be supplied to light source 3. The second setting value is a power value at which the temperature of the glass tube rises such that it does not explode even if cooling fan 4 stops.

For example, the second setting value is a power value corresponding to equal to or lower than 30% of the maximum power. According to this example, the second setting value is a power value corresponding to 25% of the maximum power.

Control section 1 controls not only the operation of cooling fan 4, but also power supply section 2 to supply power to light source 3.

If control section 1 accepts a designation signal that denotes that the first lighting mode has been designated from input section 5, control section 1 causes power supply section 2 to supply power corresponding to the first setting value to light source 3 and also causes cooling fan 4 to operate. If control section 1 accepts a designation signal that denotes that the second lighting mode has been designated from input section 5, control section 1 causes power supply section 2 to supply power corresponding to the second setting value to light source 3 and also causes cooling fan 4 to stop.

When the second lighting mode that is the lower power lighting mode has been designated, since the image display device according to this embodiment causes cooling fan 4 to stop, light source 3 is not excessively cooled. Thus, occurrence of the photo-darkening phenomenon can be prevented in the image display device.

Alternatively, the image display device according to this embodiment may have an input part through which an image signal is supplied such that control section 1 monitors whether or not an image signal is being supplied to the input part and if the image signal has not been supplied to the input part for a predetermined time, control section 1 may cause power supply section 2 to supply power corresponding to the second setting value to light source 3 and also may cause cooling fan 4 to stop.

Further alternatively, the image display device according to this embodiment may also have a projection section that projects image light in which light emitted from light source 3 has been spatially modulated; and a shutter located opposite to a plane from which image light of the projection section exits. In this case, control section 1 may monitor whether or not the shutter is open or closed and if control section 1 detects that the shutter is closed, control section 1 may cause power supply section 2 to supply power corresponding to the second setting value to light source 3 and may also cause cooling fan 4 to stop.

Further alternatively, control section 1 may monitor whether or not cooling fan 4 is operating and if control section 1 detects that cooling fan 4 stops during the first lighting mode, control section 1 may cause power supply section 2 to stop supplying power to light source 3.

Second Embodiment

In the image display device as described in Patent Literature 1, if the cooling fan breaks down and stops, the temperature of the light source will rise and thereby the glass tube will explode. Thus, the image display device is provided with a protection circuit that normally causes the light source to stop in the event that the cooling fan stops.

Figure 2:
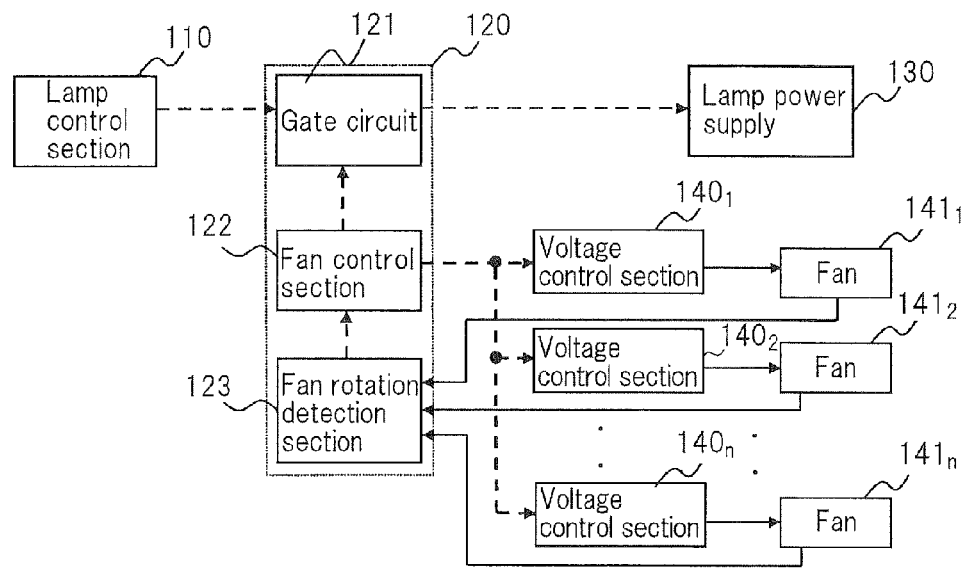
FIG. 2 is a block diagram exemplifying a protection circuit used in a system having n fans as a comparison example of an image display device according to a second embodiment of the present invention.

FIG. 2 shows an example of a protection circuit used in a system that has n fans $141_1$ to $141_n$, one of which is a lamp cooling fan.

Lamp power supply 130 is designed to supply power to the lamp based on a control signal (ON/OFF state) that is output from lamp control section 110. Protection circuit 120 is located in series with a control signal line that connects lamp control section 110 and lamp power supply 130.

Protection circuit 120 has gate circuit 121, fan control section 122, and fan rotation detection section 123.

Fan control section 122 supplies an enable signal to each of voltage control sections $140_1$ to $140_n$. Voltage control sections $140_1$ to $140_n$ are located one-to-one corresponding to fans $141_1$ to $141_n$, respectively. Voltage control sections $140_1$ to $140_n$ supply voltages to fans $141_1$ to $141_n$ corresponding to the enable signal that is output from fan control section 122.

Fans $141_1$ to $141_n$ each supply a rotation signal that represents the number of rotations thereof to fan rotation detection section 123. Fan rotation detection section 123 detects whether the image display device lies in a first state in which all fans $141_1$ to $141_n$ are rotating or in a second state in which at least one fan from among fans $141_1$ to $141_n$ is rotating based on the rotation signals that are output from fans $141_1$ to $141_n$.

If fan rotation detection section 123 detects that the image display device lies in the first state, fan rotation detection section 123 outputs a state detection signal (low level) that represents such a situation; if fan rotation detection section 123 detects that the image display device lies in the second state, fan rotation detection section 123 outputs a state detection signal (high level) that represents such a situation.

The state detection signal (low or high level) that is output from fan rotation detection section 123 is supplied to one input port of gate circuit 121 through fan control section 122. The control signal (ON/OFF state) that is output from lamp control section 110 is supplied to the other input port of gate circuit 121.

Only if the state detection signal that is output from fan rotation detection section 123 lies in the low level, gate circuit 121 will supply the control signal that is output from lamp control section 110 to lamp power supply 130. If the state detection signal that is output from fan rotation detection section 123 lies in the high level, gate circuit 121 will supply the OFF state signal as a control signal to lamp power supply 130.

In the system shown in FIG. 2, even if any one of fans $141_1$ to $141_n$ stops, protection circuit 120 turns off lamp power supply 130. Thus, if the lamp cooling fan stops, power to be supplied to the lamp will stop.

In the foregoing system, however, if the light source cooling fan stops, the light source will also stop. Thus, it is difficult to apply control that causes the light source cooling fan to stop during the low power lighting mode.

Next, as a second embodiment of the present invention, an image display device that not only maintains the function of the protection circuit, but also causes the light source cooling fan to stop during the low power lighting mode will be described.

Figure 3:
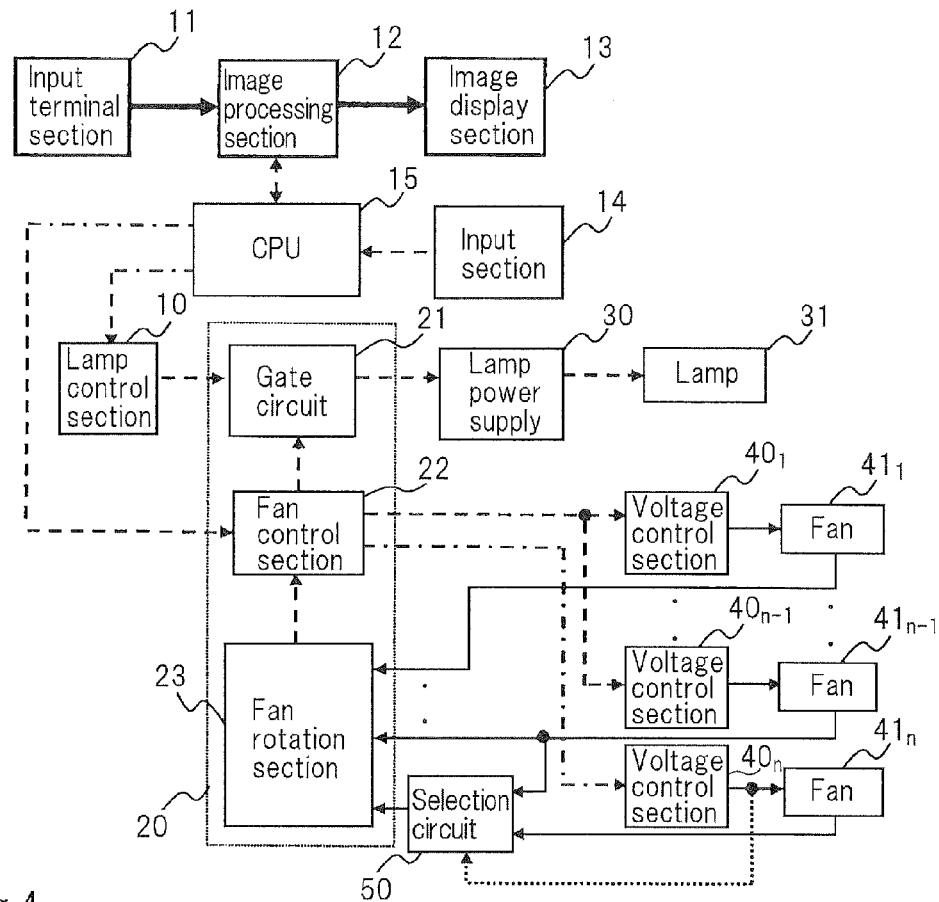
FIG. 3 is a block diagram outlining the image display device according to the second embodiment of the present invention.

FIG. 3 is a block diagram outlining the image display device according to the second embodiment of the present invention.

Referring to FIG. 3, the image display device has input terminal section 11, image processing section 12, image display section 13, input section 14, CPU (Central Processing Unit) 15, lamp control section 10, fan control section having protection function 20, lamp power supply 30, lamp 31, voltage control sections $40_1$ to $40_n$, fans $41_1$ to $41_n$, and selection circuit 50.

Lamp 31 is a high pressure mercury lamp or the like. Lamp power supply 30 supplies power to the lamp. Lamp control section 10 controls lamp power supply 30 to supply power to lamp 31 based on a lamp control signal that is output from CPU 15. Specifically, lamp control section 10 outputs both an ON/OFF state signal that is a power supply control signal and a power designation signal that represents a power value.

An image signal is supplied from an external image supply unit to image processing section 12 through input terminal section 11. The external image supply unit is, for example, an information processing unit such as a personal computer.

Image processing section 12 performs a process that is necessary to cause image display section 13 to display an image signal that is supplied from input terminal section 11. Image display section 13 has a display element irradiated with light emitted from lamp 31 and a projection section that projects an image generated by the display element. The display element is, for example, a liquid crystal panel or a DMD.

Fans $41_1$ to $41_n$ each output a rotation signal that represents the number of rotations that changes based on the input voltage. The rotation signal is output at intervals of a predetermined time. Fan $41_n$ cools lamp 31. Remaining fans $41_1$ to $41_{n-1}$ are an air exhaust fan, an air intake fan, and so forth. An air exhaust fan and an air intake fan are mounted on an enclosure that accommodates image processing section 12, image display section 13, CPU 15, lamp control section 10, fan control section having protection function 20, lamp power supply 30, lamp 31, voltage control sections $40_1$ to $40_n$, and so forth.

Voltage control sections $40_1$ to $40_n$ are located one-to-one corresponding to fans $41_1$ to $41_n$, respectively. Voltage control sections $40_1$ to $40_{n-1}$ supply voltages to fans $41_1$ to $41_{n-1}$, respectively, based on a first enable signal that is output from fan control section 22. Voltage control section $40_n$ supplies voltage to fan $41_n$ based on a second enable signal that is output from fan control section 22. In other words, a control section for fans $41_1$ to $41_{n-1}$ is independent from a control section for fan $41_n$.

Fan control section having protection function 20 has gate circuit 21, fan control section 22, and fan rotation detection section 23.

Fan control section 22 supplies not only the first enable signal to each of voltage control sections $40_1$ to $40_{n-1}$, but also the second enable signal to voltage control section $40_n$ based on a fan control signal that is output from CPU 15.

Rotation signals that are output from fans $41_1$ to $41_{n-1}$ are supplied to fan rotation detection section 23. The rotation signal that is output from fan $41_{n-1}$ is branched two ways. One branched rotation signal is supplied to one input port of selection circuit 50.

The rotation signal that is output from fan $41_n$ is supplied to the other input port of selection circuit 50. Voltage control section $40_n$ supplies an input selection control signal to selection circuit 50. If the signal that is output from voltage control section $40_n$ represents the ON state, selection circuit 50 selects the rotation signal that is supplied from fan $41_n$. In contrast, if the signal that is output from voltage control section $40_n$ represents the OFF state, selection circuit 50 selects the rotation signal that is supplied from fan $41_{n-1}$. Selection circuit 50 outputs the selected rotation signal to fan rotation detection section 23.

Fan rotation detection section 23 detects a first state that denotes that all input rotation signals represent the rotation state or a second state that denotes that at least one of the input rotation signals represents the stop state based on the rotation signals that are output from fans $41_1$ to $41_{n-1}$ and the rotation signal that is output from selection circuit 50. If fan rotation detection section 23 detects the first state, fan rotation detection section 23 outputs a state detection signal (low level) that represents such a situation; if fan rotation detection section 23 detects the second state, fan rotation detection section 23 outputs a state detection signal (high level) that represents such a situation.

The state detection signal (low or high level) that is output from fan rotation detection section 23 is supplied to one input port of gate circuit 21 through fan control section 22. The power supply control signal (ON/OFF state) that is output from lamp control section 10 is supplied to the other input port of gate circuit 21. The power designation signal that is output from lamp control section 10 is supplied directly to lamp power supply 30, without going through gate circuit 21.

Only if the state detection signal that is output form fan rotation detection section 23 lies in the low level, will gate circuit 21 supply the power supply control signal (ON state) that is output from lamp control section 10 to lamp power supply 30. If the state detection signal that is output from fan rotation detection section 23 lies in the high level, gate circuit 21 will supply the OFF state signal as the power supply control signal to lamp power supply 30.

Input section 14 has a plurality of buttons. The user can designate a first lighting mode in which a power value supplied to lamp 31 is a first setting value or can designate a second lighting mode in which a power value supplied to lamp 31 is a second setting value that is smaller than the first setting value using at least one button from among the plurality of buttons. Input section 14 outputs a designation signal that represents the designated mode.

The first setting value is, for example, the maximum power that can be supplied to lamp 31. The second setting value is a power value at which the temperature of lamp 31 rises such that it does not explode even if fan $41_n$ stops. For example, the second setting value is a power value that corresponds to equal to or lower than 30% of the maximum power. According to this example, the second setting value is a power value corresponding to 25% of the maximum power.

CPU 15 controls the operation of cooling fan 4 and power supply section 2 to supply power to light source 3.

When CPU 15 accepts the designation signal that denotes that the first lighting mode has been designated from input section 14, CPU 15 supplies not only a first lamp control signal to lamp control section 10, but also a first fan control signal to fan control section 22 so as to cause lamp power supply 30 to supply power that corresponds to the first setting value to lamp 31 and cause fans $41_1$ to $41_n$ to operate, respectively.

When CPU 15 accepts the designation signal that denotes that the second lighting mode has been designated from input section 14, CPU 15 supplies not only a second lamp control signal to lamp control section 10, but also a second fan control signal to fan control section 22 so as to cause lamp power supply 30 to supply power that corresponds to the second setting value to lamp 31 and cause fans $41_1$ to $41_{n-1}$ to operate and fan $41_n$ to stop, respectively. In this case, unless fan $41_n$ is caused to stop, the lamp will be excessively cooled and thereby the service life of the lamp will be shortened.

Next, the operation of the image display device according to this embodiment will be specifically described.

Figure 4:
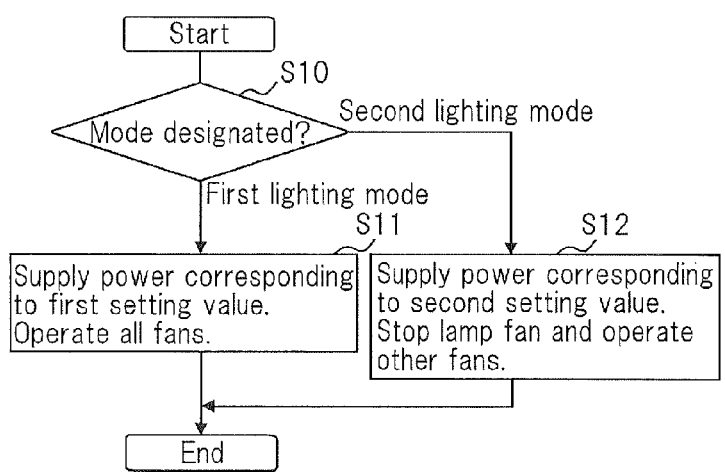
FIG. 4 is a flow chart describing the operation of a lamp/fan control performed in the image display device shown in FIG. 3.

FIG. 4 is a flow chart describing a lamp/fan control operation.

CPU 15 determines whether the first or second lighting mode has been designated based on the designation signal that is supplied from input section 14 (at step S10).

If the determined result at step S10 denotes that the first lighting mode has been designated, CPU 15 supplies not only the first lamp control signal to lamp control section 10, but also the first fan control signal to fan control section 22 (at step S11).

When lamp control section 10 receives the first lamp control signal, lamp control section 10 supplies not only the control signal (ON state) to gate circuit 21, but also the power designation signal that designates a power value that corresponds to the first setting value to lamp power supply 30.

When lamp power supply 30 receives the control signal (ON state) and the power designation signal, lamp power supply 30 supplies a power value designated by the power designation signal to lamp 31.

When fan control section 22 receives the first fan control signal, fan control section 22 supplies not only the first enable signal (ON state) to voltage control sections $40_1$ to $40_{n-1}$, but also the second enable signal (ON state) to voltage control section $40_n$. Voltage control sections $40_1$ to $40_n$ supply voltages to corresponding fans based on the first and second enable signals.

Since voltage control section $40_n$ supplies voltage to fan $41_n$ at step S11, selection circuit 50 supplies the rotation signal that is output from fan $41_n$ to fan rotation detection section 23. Thus, gate circuit 21 supplies the control signal (ON state) that is output from lamp control section 10 directly to lamp power supply 30.

If the determination result at step S10 denotes that the second lighting mode has been designated, CPU 15 supplies not only the second lamp control signal to lamp control section 10, but also the second fan control signal to fan control section 22 (at step S12).

When lamp control section 10 receives the second lamp control signal, lamp control section 10 supplies not only the control signal (ON state) to gate circuit 21, but also the power designation signal that designates a power value that corresponds to the second setting value to lamp power supply 30. When lamp power supply 30 receives the control signal (ON state) and the power designation signal, lamp power supply 30 supplies a power value designated by the power designation signal to lamp 31.

When fan control section 22 receives the second fan control signal, fan control section 22 supplies not only the first enable signal (ON state) to voltage control sections $40_1$ to $40_{n-1}$, but also the second enable signal (OFF state) to voltage control section $40_n$.

Voltage control sections $40_1$ to $40_{n-1}$ supply voltages to corresponding fans based on the first enable signal. Voltage control section $40_n$ stops supplying voltage to fan $41_n$ based on the second enable signal.

Since voltage control section $40_n$ stops supplying voltage to fan $41_n$ at step S12, selection circuit 50 supplies the rotation signal that is output from fan $41_{n-1}$ to fan rotation detection section 23. Thus, gate circuit 21 supplies the control signal (ON state) that is output from lamp control section 10 directly to lamp power supply 30.

In the foregoing operation, during the second lighting mode (at step S12), although fan $41_n$ stops, since the rotation signal that is output from fan $41_{n-1}$ is supplied from selection circuit 50 to fan rotation detection section 23, the control signal (ON state) that is output from lamp control section 10 is supplied to lamp power supply 30 through gate circuit 21. Thus, even if fan $41_n$ stops, lamp 31 remains continuously lit due to power that is supplied according to the second setting value.

Next, a characteristic operation of the image device according to this embodiment will be described in detail in comparison with the operation of the device shown in FIG. 2.

Figure 5:
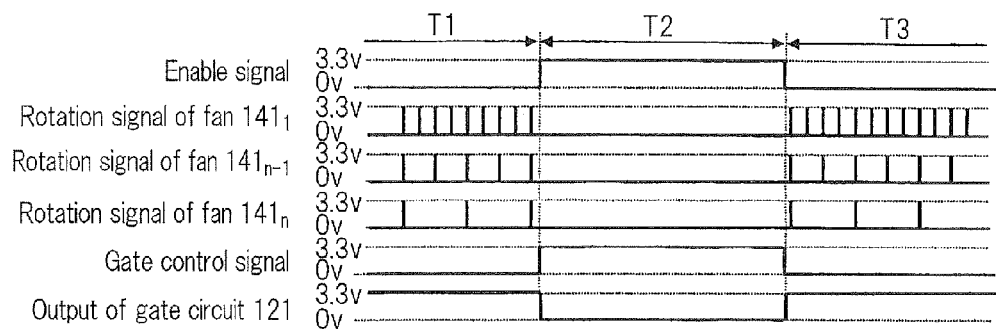
FIG. 5 is a timing chart describing a lamp lighting control based on a fan rotation signal used in the system shown in FIG. 2.
Figure 6:
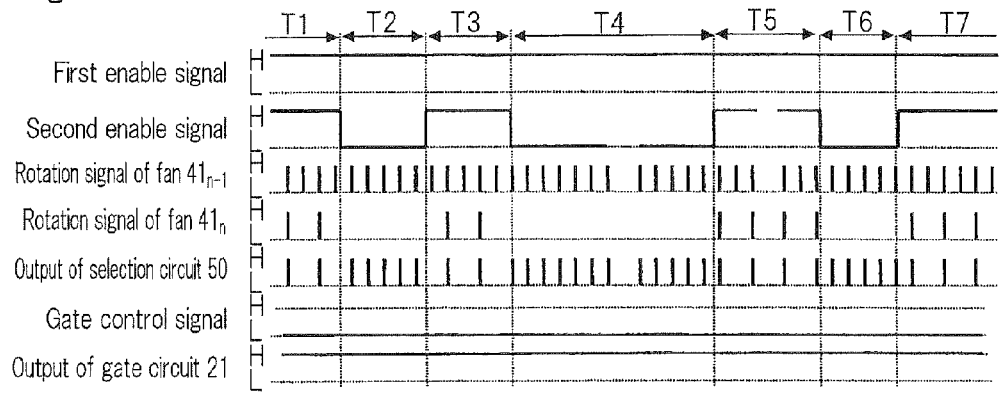
FIG. 6 is a timing chart describing a lamp lighting control based on a fan rotation signal used in the image display device shown in FIG. 3.

FIG. 5 is a timing chart with respect to a lamp lighting control based on a fan rotation signal of the system shown in FIG. 3. FIG. 6 is a timing chart with respect to a lamp lighting control based on the fan rotation signal of the image display device according to this embodiment.

First, referring to FIG. 5, the lamp lighting control that the circuit shown in FIG. 3 performs will be described. In FIG. 5, fans $141_1$, $141_{n-1}$, and $141_n$ correspond to an air intake fan, an air exhaust fan, and a lamp fan, respectively.

At period T1, since rotation signals that are output from fans $141_1$, $141_{n-1}$, and $141_n$ are supplied to fan rotation detection $123$, an OFF state signal (0 V) is supplied as a gate control signal from fan control section $122$ to gate circuit $121$. In this case, an ON state signal (3.3 V) is supplied from gate circuit $121$ to lamp power supply $130$. As a result, lamp $131$ lights.

At period T2, since rotation signals that are output from fans $141_1$, $141_{n-1}$, and $141_n$ are not supplied to fan rotation detection section $123$, the ON state signal (3.3 V) is supplied as the gate control signal from fan control section $122$ to gate circuit $121$. In this case, the OFF state signal (0 V) is supplied from gate circuit $121$ to lamp power supply $130$. As a result, lamp $131$ does not light.

Next, referring to FIG. 6, the lamp lighting control that the image display device performs according to this embodiment will be described. In FIG. 6, fans $41_1$, $41_{n-1}$, and $41_n$ correspond to an air intake fan, an air exhaust fan, and a lamp fan, respectively.

At period T1, since both the first and second enable signals lie in the high level, fans $41_1$, $41_{n-1}$, and $41_n$ rotate. In this case, since selection circuit $50$ selects the rotation signal of fan $41_n$, the rotation signals that are output from fans $41_1$, $41_{n-1}$, and $41_n$ are supplied to fan rotation detection section $23$. Thus, a low level signal is supplied as the gate control signal from fan control section $22$ to gate circuit $21$, whereas a high level signal is supplied from gate circuit $21$ to lamp power supply $30$. As a result, lamp $131$ lights.

Each of the operations performed at periods T3, T5, and T7 is the same as the operation performed at period T1.

At period T2, since the first enable signal lies in the high level, fans $41_1$ and $41_{n-1}$ rotate. However, since the second enable signal lies in the low level, fan $41_n$ does not rotate. In this case, since selection circuit $50$ selects the rotation signal of fan $41_{n-1}$, the rotation signals that are output from fans $41_1$ and $41_{n-1}$ are supplied to fan rotation detection section $23$ and the rotation signal that is output from fan $41_{n-1}$ is supplied to fan rotation detection $23$ through selection circuit $50$ instead of the rotation signal that is output from fan $41_n$. Thus, a low level signal is supplied as the gate control signal from fan control section $22$ to gate circuit $21$, whereas a high level signal is supplied from gate circuit $21$ to lamp power supply $30$. As a result, lamp $131$ lights.

Each of the operations performed at periods T4 and T6 is the same as the operation performed at period T2.

Each of the operations performed at periods T1, T3, T5, and T7 shown in FIG. 6 is the same as the operation performed in the first lighting mode, whereas each of the operations performed at periods T2, T4, and T6 is the same as the operation performed in the second lighting mode. In the first lighting mode, while fans $41_1$, $41_{n-1}$, and $41_n$ are being rotated, lamp $31$ can be lit. By contrast, in the second lighting mode, while fans $41_1$ and $41_{n-1}$ are being rotated and fan $41_n$ is being stopped, the lamp can be lit.

If at least one fan from among fans $41_1$ to $41_n$ breaks down and stops while the image display device according to this embodiment is operating in the first lighting mode, fan rotation detection $23$ detects that the fan is in the stop state. As a result, the gate control signal changes to the high level and thereby a low level signal is supplied from gate circuit $21$ to lamp power supply $30$. As a result, lamp $131$ is turned off.

If at least one fan from among fans $41_1$ to $41_n$ breaks down and stops while the image display device is operating in the second lighting mode, fan rotation detection $23$ detects that the fan is in the stop state. As a result, the control signal that is output to gate circuit $21$ changes to the high level and thereby a low level signal is supplied from gate circuit $21$ to lamp power supply $30$. As a result, lamp $31$ is turned off.

Thus, such a protection function can be provided in each of the first and second lighting modes. In the second lighting mode, not only the lamp is operated at 25% of the maximum power, but also the lamp cooling fan is stopped. As a result, more power can be saved than in the case of the foregoing embodiment.

In the image display device according to this embodiment, CPU $15$ may monitor whether or not an image signal is supplied to input terminal section $11$. If the image signal has not been supplied to input terminal section $11$ for a predetermined time, CPU $15$ may supply not only the second lamp control signal to lamp control section $10$, but also the second fan control signal to fan control section $22$ so as to cause lamp power supply $30$ to supply power that corresponds to the second setting value to lamp $31$ and cause fans $41_1$ to $41_{n-1}$ to operate and fan $41_n$ to stop, respectively.

In addition, image display section $13$ may have a projection section that projects image light in which light emitted from lamp $31$ has been spatially modulated; and a shutter located opposite to a plane from which the image light of the projection section exits. In this case, CPU $15$ may monitor whether the shutter is open or closed. If CPU $15$ detects that the shutter is closed, CPU $15$ may supply not only the second lamp control signal to lamp control section $10$, but also the second fan control signal to fan control section $22$ so as to cause lamp power supply $30$ to supply power that corresponds to the second setting value to lamp $31$ and cause fan $41_1$ to $41_{n-1}$ to operate and fan $41_n$ to stop, respectively.

The second lighting mode may be designated by performing an input operation that activates an AV mute function. The AV mute function is a function performed by image display section $13$ that sets all pixels to "black" such that light is not projected. If the user performs the input operation that activates the AV mute operation through input section $14$, CPU $15$ accepts a designation signal that designates the AV mute operation from input section $14$ and activates the AV mute function. When CPU $15$ activates the AV mute function, CPU $15$ may supply not only the second lamp control signal to lamp control section $10$, but also the second fan control signal to fan control section $22$ so as to cause lamp power supply $30$ to supply power that corresponds to the second setting value to lamp $31$ and cause fans $41_1$ to $41_{n-1}$ to operate and fan $41_n$ to stop, respectively.

Lamp control section $10$, gate circuit $21$, and fan control section $22$ shown in FIG. 3 may be composed of one control unit. In this case, while the control unit is receiving the first state signal (low level) from fan rotation detection section $23$, the control unit may perform the forgoing control in the first or second lighting mode. When the control unit receives the second state signal (high level) from fan rotation detection section $23$, the control unit may cause lamp power supply $30$ to stop supplying power to lamp $31$.

Third Embodiment

When a high pressure mercury lamp or the like is used as a light source at a place whose altitude is high (a place having a low atmospheric pressure, namely a high altitude), the temperature of the light source tends to rise more easily than in the case in which the light source is used at a low altitude (a place having a high atmospheric pressure). Thus, when the light source is used at a high altitude, if it is lit in the low power lighting mode and the light source cooling fan is stopped, the temperature of the light source will rise and thereby the glass tube of the light source will explode.

Next, an image display device according to a third embodiment of the present invention will be described. The image display device according to the third embodiment can operate the light source cooling fan even if the low powder lighting mode is set up when the image display device is used at a high altitude.

Figure 7:
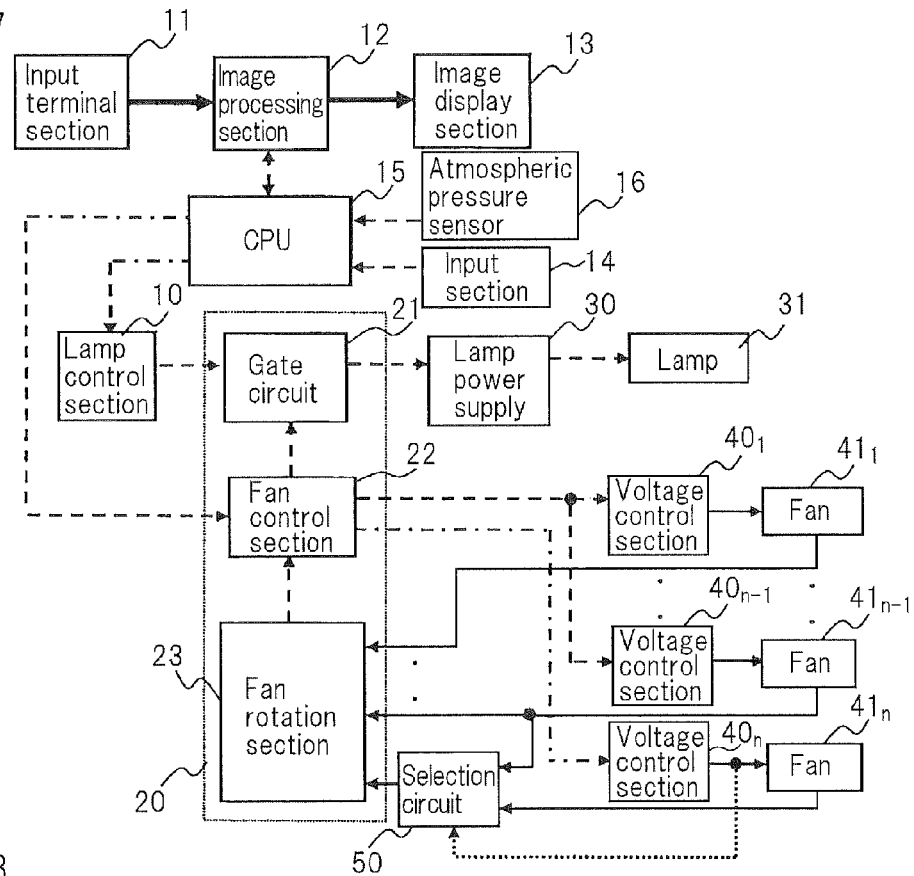
FIG. 7 is a block diagram showing the structure of an image display device according to a third embodiment of the present invention

FIG. 7 is a block diagram showing the structure of the image display device according to the third embodiment of the present invention.

Referring to FIG. 7, the structure of the image display device is the same as that of the image display device according to the second embodiment except that the former has atmospheric pressure sensor 16. In FIG. 7, similar structural portions are denoted by similar reference numerals.

An output of atmospheric pressure sensor 16 is supplied to CPU 15. CPU 15 stores a threshold based on which it determines whether or not the image display device is located at a high altitude. If the output value of atmospheric pressure sensor 16 exceeds the threshold, CPU 15 determines that the image display device is located at a high altitude. If the output value of atmospheric pressure sensor 16 is smaller than the threshold, CPU 15 determines that the image display device is located at other than a high altitude.

If CPU 15 determines that the image display device is located at other than a high altitude, CPU 15 performs the same control as it performs in the second embodiment. If CPU 15 determines that the image display device is located at a high altitude, CPU 15 executes a third lighting mode as a substitute low power lighting mode of the second lighting mode.

In the third lighting mode, CPU 15 supplies not only a second lamp control signal to lamp control section 10, but also a first fan control signal to fan control section 22 so as to cause lamp power supply 30 to supply power that corresponds to a second setting value to lamp 31 and cause fans $41_1$ to $41_n$ to operate, respectively.

When lamp control section 10 receives the second lamp control signal, lamp control section 10 supplies not only a control signal (ON state) to gate circuit 21, but also a power designation signal that designates a power value that corresponds to the second setting value to lamp power supply 30. When lamp power supply 30 receives the control signal (ON state) and the power designation signal, lamp power supply 30 supplies a power value designated by the power designation signal to lamp 31.

When fan control section 22 receives a first fan control signal, fan control section 22 supplies not only a first enable signal (ON state) to voltage control sections $40_1$ to $40_{n-1}$, but also a second enable signal (ON state) to voltage control section $40_n$. Voltage control sections $40_1$ to $40_n$ supply voltages to corresponding fans based on the first and second enable signals.

In the foregoing operation, although lamp 3 is lit by using low power, since fan $41_n$ is operated, the glass tube can be prevented from exploding. Since the image display device is operated in the second lighting mode when the image display device is located at other than a high altitude, thus photo-darkening phenomenon, which is caused by excess cooling, can be prevented from taking place in lamp 31.

The timing at which the third lighting mode is performed is the same as that at which the second lighting mode is performed in the second embodiment.

When the image display device according to the first embodiment is provided with atmospheric pressure sensor 16, the image display device can operate in the same way in which the image display device operates in the third embodiment. In this case, if the output value of atmospheric pressure sensor 16 exceeds the threshold, control section 1 determines that the image display device is located at a high altitude. If the output value of atmospheric pressure sensor 16 is less than the threshold, control section 1 determines that the device is located at other than a high altitude. If control section 1 determines that the image display device is located at a high altitude, control section 1 executes the third lighting mode instead of the second lighting mode.

The present invention has been described with reference to the embodiments. However, it should be understood by those skilled in the art that the structure and details of the present invention may be changed in various manners without departing from the scope of the present invention.

For example, in the image display device according to the second embodiment, voltages supplied to fans $41_1$ to $41_{n-1}$ of fans $41_1$ to $41_n$ in the second lighting mode may be different from those in the first lighting mode. In addition, a refresh period may be designated so as to prevent occurrence of photo-darkening phenomenon.

Next, controls that use a refresh period will be described briefly.

Figure 8:
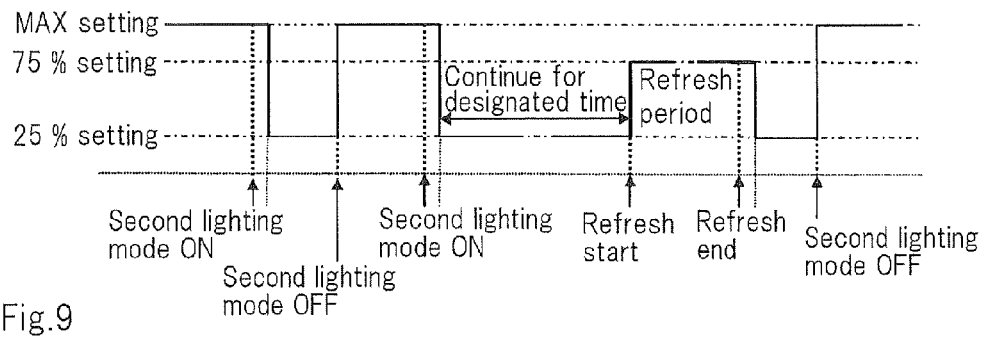
FIG. 8 is a timing chart exemplifying a lamp control performed in the image display device according to the second embodiment of the present invention.
Figure 9:
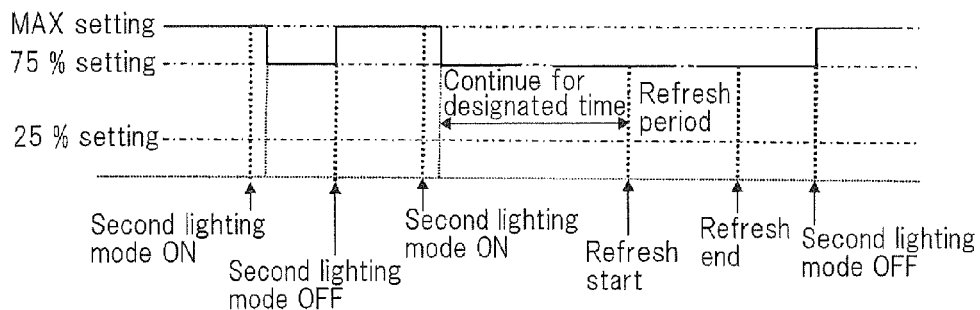
FIG. 9 is a timing chart exemplifying a fan control, except for a lamp fan, performed in the image display device according to the second embodiment of the present invention.
Figure 10:
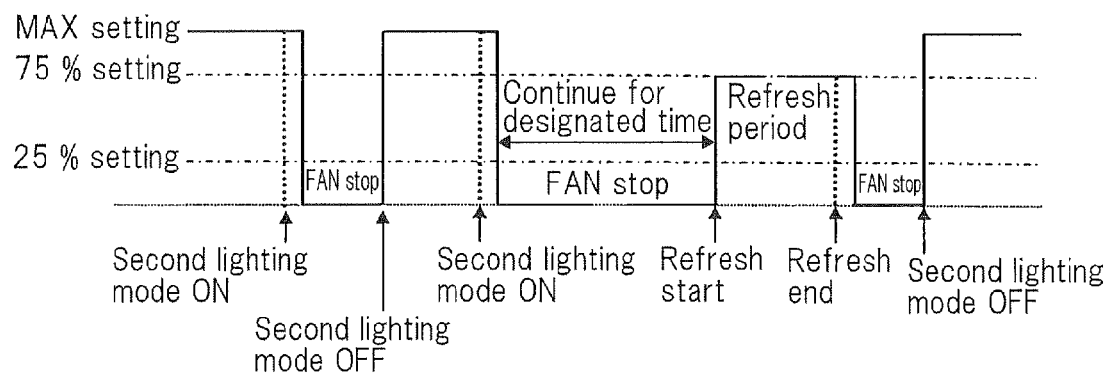
FIG. 10 is a timing chart exemplifying a lamp fan control performed in the image display device according to the second embodiment of the present invention.

FIG. 8 is a timing chart showing a control for the lamp. FIG. 9 is a timing chart showing a control for fans $41_1$ to $41_{n-1}$. FIG. 10 is a timing chart showing a control for fan $41_n$.

In the control for the lamp shown in FIG. 8, if the image display device that lies in the first lighting mode is switched to the second lighting mode, power consumed therein is decreased up to 25% of the maximum power. As shown in FIG. 9 and FIG. 10, in the first lighting mode, a first voltage is supplied to fans $41_1$ to $41_n$. By contrast, in the second lighting mode, as shown in FIG. 9, a second voltage that is lower than the first voltage is supplied to fans $41_1$ to $41_{n-1}$, whereas as shown in FIG. 10, fan $41_n$ is stopped.

As shown in FIG. 8, if the image display device is operated in the second lighting mode for a designated time, CPU 15 will supply a refresh start signal to lamp control section 10. Lamp control section 10 supplies a power designation signal that represents a power value that corresponds to 75% of the maximum power to lamp 31. During the refresh period, lamp 31 is lit at 75% of the maximum power. As shown in FIG. 9 and FIG. 10, during the refresh period, the second voltage is supplied to fans $41_1$ to $41_n$.

While the image display device is operating in the second lighting mode, lamp 31 is refreshed at intervals each having a predetermined time. The refresh period is, for example, around five minutes. The designated time for which the image display device continues to operate in the second lighting mode is around 30 minutes to 50 minutes.

The present invention can be applied to image display devices of all types that have a high pressure mercury lamp or the like as a light source and that display an image in which light emitted from the light source has been spatially modulated. Specifically, the present invention can be applied to a liquid crystal display and a projector.

The invention claimed is:

1. An image display device that has a light source and that displays an image in which light emitted from the light source has been spatially modulated, comprising:
a power supply section that supplies power to said light source;
a first cooling fan that cools said light source;
an input section that accepts an input signal that designates either a first lighting mode in which a power value supplied to said light source is a first setting value or a second lighting mode in which the power value supplied to said light source is a second setting value that is smaller than said first setting value and outputs a designation signal that represents the designated mode;
an input terminal to which an image signal is supplied; and a control section that controls an operation of said first cooling fan and controls said power supply section to supply power to said light source, wherein if said control section accepts said designation signal that denotes that said first lighting mode has been designated from said input section, said control section causes said power supply section to supply power corresponding to said first setting value to said light source and said first cooling fan to operate, wherein if said control section accepts said designation signal that denotes that said second lighting mode has been designated from said input section, said control section causes said power supply section to supply power corresponding to said second setting value to said light source and causes said first cooling fan to stop, and wherein if said image signal has not been supplied to said input terminal for a predetermined time, said control section causes said power supply section to supply power corresponding to said second setting value to said light source and causes said cooling fan to stop.

2. The image display device as set forth in claim 1, wherein said control section monitors whether or not said first cooling fan is operating and if said control section detects that said first cooling fan stops during said first lighting mode, said controlling section causes said power supply section to stop supplying power to said light source.

3. The image display device as set forth in claim 1, further comprising:

a second cooling fan that outputs a second rotation signal that denotes whether or not said second cooling fan itself is rotating;

a first voltage control section that supplies a voltage to said first cooling fan;

a second voltage control section that supplies a voltage to said second cooling fan;

a selection circuit that inputs a first rotation signal that said first cooling fan outputs and that denotes whether or not said first cooling fan itself is rotating, said second rotation signal, said first rotation signal and said second rotation signal being input from said first and second cooling fans, respectively, that outputs said first rotation signal while said first voltage control section is outputting the voltage to said first cooling fan and outputs said second rotation signal while said first voltage control section is not outputting the voltage to said first cooling fan; and a fan rotation detection section that inputs said second rotation signal from said second cooling fan and an output signal of said selection circuit, if both the input signals denote that said first and second cooling fans are rotating, outputs a first state signal that represents such a situation, and if the input signals denote that said first or said second cooling fan is not rotating, outputs a second state signal that represents such a situation, wherein while said control section is receiving said first state signal from said fan rotation detection section, said control section executes a control in said first or second lighting mode, and if said control section receives said second state signal from said fan rotation detection section, said control section causes said power supply section to stop supplying power to said light source.

4. The image display device as set forth in claim 1, further comprising:

an atmospheric pressure sensor, wherein if an output value of said atmospheric pressure sensor exceeds a threshold, said control section determines that the image display device is located at a high altitude and if the output value of said atmospheric pressure sensor is less than said threshold, said control section determines that the image display device is located at other than a high altitude, wherein if said control section determines that the image display device is located at said high altitude and said control section accepts said designation signal that denotes that said second lighting mode has been designated from said input section, said control section causes said power supply section to supply power corresponding to said second setting value to said light source and causes said first cooling fan to stop, and wherein if said control section determines that the image display device is located at other than said high altitude and accepts said designation signal that denotes that said second lighting mode has been designated from said input section, said control section causes said power supply section to supply power corresponding to said second setting value to said light source and causes said first cooling fan to operate.

5. The image display device as set forth in claim 1, wherein said second setting value is a power value corresponding to equal to or lower than 30% of a maximum power that can be supplied to said light source.

6. The image display device as set forth in claim 1, wherein the input signal that designates said second lighting mode comprises an input signal that activates an audio/video (AV) mute function.

7. An image display device that has a light source and that displays an image in which light emitted from the light source has been spatially modulated, comprising:

a power supply section that supplies power to said light source;

a first cooling fan that cools said light source;

an input section that accepts an input signal that designates either a first lighting mode in which a power value supplied to said light source is a first setting value or a second lighting mode in which the power value supplied to said light source is a second setting value that is smaller than said first setting value and outputs a designation signal that represents the designated mode;

a projection section that projects image light in which light emitted from the light source has been spatially modulated;

a shutter located opposite to a plane from which the image light of said projection section exits; and a control section that controls an operation of said first cooling fan and controls said power supply section to supply power to said light source, wherein if said control section accepts said designation signal that denotes that said first lighting mode has been designated from said input section, said control section causes said power supply section to supply power corresponding to said first setting value to said light source and said first cooling fan to operate, wherein if said control section accepts said designation signal that denotes that said second lighting mode has been designated from said input section, said control section causes said power supply section to supply power corresponding to said second setting value to said light source and causes said first cooling fan to stop, and wherein said control section monitors whether said shutter is open or closed and if said control section detects that said shutter is closed, said control section causes said power supply section to supply power corresponding to said second setting value to said light source and causes said cooling fan to stop.

8. The image display device as set forth in claim 7, wherein said control section monitors whether or not said first cooling fan is operating and if said control section detects that said first cooling fan stops during said first lighting mode, said controlling section causes said power supply section to stop supplying power to said light source.

9. The image display device as set forth in claim 7, further comprising:
   a second cooling fan that outputs a second rotation signal that denotes whether or not said second cooling fan itself is rotating;
   a first voltage control section that supplies a voltage to said first cooling fan;
   a second voltage control section that supplies a voltage to said second cooling fan;
   a selection circuit that inputs a first rotation signal that said first cooling fan outputs and that denotes whether or not said first cooling fan itself is rotating, said second rotation signal, said first rotation signal and said second rotation signal being input from said first and second cooling fans, respectively, that outputs said first rotation signal while said first voltage control section is outputting the voltage to said first cooling fan and outputs said second rotation signal while said first voltage control section is not outputting the voltage to said first cooling fan; and
   a fan rotation detection section that inputs said second rotation signal from said second cooling fan and an output signal of said selection circuit, if both the input signals denote that said first and second cooling fans are rotating, outputs a first state signal that represents such a situation, and if the input signals denote that said first or said second cooling fan is not rotating, outputs a second state signal that represents such a situation,
   wherein while said control section is receiving said first state signal from said fan rotation detection section, said control section executes a control in said first or second lighting mode, and if said control section receives said second state signal from said fan rotation detection section, said control section causes said power supply section to stop supplying power to said light source.

10. The image display device as set forth in claim 7, further comprising:
   an atmospheric pressure sensor,
   wherein if an output value of said atmospheric pressure sensor exceeds a threshold, said control section determines that the image display device is located at a high altitude and if the output value of said atmospheric pressure sensor is less than said threshold, said control section determines that the image display device is located at other than a high altitude, wherein if said control section determines that the image display device is located at said high altitude and said control section accepts said designation signal that denotes that said second lighting mode has been designated from said input section, said control section causes said power supply section to supply power corresponding to said second setting value to said light source and causes said first cooling fan to stop, and
   wherein if said control section determines that the image display device is located at other than said high altitude and accepts said designation signal that denotes that said second lighting mode has been designated from said input section, said control section causes said power supply section to supply power corresponding to said second setting value to said light source and causes said first cooling fan to operate.

11. A light source cooling method for an image display device having a light source, a power supply section that supplies power to the light source, an input terminal to which an image signal is supplied and a cooling fan that cools said light source and that displays an image in which light emitted from said light source has been spatially modulated, comprising:
   causing said power supply section to supply power corresponding to said first setting value to said light source and causing said cooling fan to operate if a first lighting mode, in which a power value supplied to said light source is a first setting value, is designated;
   causing said power supply section to supply power corresponding to said second setting value to said light source and causing said cooling fan to stop if a second lighting mode, in which the power value supplied to said light source is a second value that is smaller than said first setting value, is designated; and
   causing said power supply section to supply power corresponding to said second setting value to said light source and causing said cooling fan to stop if said image signal is not supplied to said input terminal for a predetermined time.

\* \* \* \* \*